United States Patent
Bruegl et al.

(10) Patent No.: US 7,136,207 B2
(45) Date of Patent: Nov. 14, 2006

(54) HOLOGRAPHIC DISPLAY SYSTEM

(75) Inventors: Juergen Bruegl, Munich (DE); Michael Heimrath, Fuerstenfeldbruck (DE); Sonja Hauser, Friedberg (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 11/013,518

(22) Filed: Dec. 17, 2004

(65) Prior Publication Data

US 2005/0195455 A1 Sep. 8, 2005

Related U.S. Application Data

(63) Continuation of application No. PCT/EP03/04484, filed on Apr. 30, 2003.

(30) Foreign Application Priority Data

Jun. 20, 2002 (DE) ................ 102 27 467

(51) Int. Cl.
   *G03H 1/00* (2006.01)
   *G03H 1/28* (2006.01)
(52) U.S. Cl. .................. 359/13; 359/14; 359/15; 359/22; 353/14
(58) Field of Classification Search .......... 359/1, 359/13, 14, 15, 22, 24; 353/14, 15
See application file for complete search history.

(56) References Cited

U.S. PATENT DOCUMENTS

| 4,708,438 | A | | 11/1987 | LaRussa et al. |
| 5,112,121 | A | * | 5/1992 | Chang et al. .................. 359/15 |
| 5,313,317 | A | * | 5/1994 | Saburi et al. .................. 359/13 |
| 6,714,327 | B1 | * | 3/2004 | Abersfelder et al. .......... 359/13 |
| 2003/0020880 | A1 | | 1/2003 | Knoll et al. |

FOREIGN PATENT DOCUMENTS

| DE | 693 05 713 T2 | | 5/1997 |
| DE | 693 12 047 T2 | | 10/1997 |
| DE | 197 04 740 A1 | | 8/1998 |
| DE | 100 36 570 A1 | | 2/2002 |
| DE | WO 01/02892 A1 | * | 11/2005 | .................. 359/13 |
| EP | 0 286 962 A2 | | 4/1988 |
| EP | 0 463 888 A2 | | 1/1992 |
| EP | 0 467 328 A2 | | 1/1992 |

\* cited by examiner

*Primary Examiner*—Fayez G. Assaf
(74) *Attorney, Agent, or Firm*—Crowell & Moring LLP

(57) ABSTRACT

A holographic display system for a vehicle includes a projection unit (2), a holographic beam combiner (3), and a viewing mirror (4, 4'). The projection unit includes a light source for the emission of a luminous signal and a controllable imaging unit illuminated by the light source, with which image information can be modulated on the luminous signal. The modulated luminous signal can be directed against the holographic beam combiner. The viewing mirror (4, 4') is provided in or on the vehicle, by which mirror light radiated from the holographic beam combiner (3, 3') can be directed into the optical perception range of a user.

16 Claims, 1 Drawing Sheet

HOLOGRAPHIC DISPLAY SYSTEM

CROSS REFERENCE TO RELATED APPLICATIONS

This application is a continuation of International Patent Application No. PCT/EP2003/004484, filed Apr. 30, 2003, designating the United States of America, and published in German as WO 2004/001482 A1, the entire disclosure of which is incorporated herein by reference. Priority is claimed based on Federal Republic of Germany Patent Application No. 102 27 467.3, filed Jun. 20, 2002.

FIELD OF THE INVENTION

The invention relates to a holographic system for vehicles, especially for motor vehicles, comprising a projection unit and a holographic beam combiner. The projection unit includes a light source for the emission of a light signal and a controllable imaging unit illuminated by the light source, by which image information can be modulated on the light signal and the modulated light signal can be directed onto the holographic beam combiner.

BACKGROUND AND SUMMARY OF THE INVENTION

In DE 197 04 740 A1 a display system of this kind is disclosed for aircraft and motor vehicles. In it a light source is provided which beams polychrome laser light onto an imaging unit designed as an LC microdisplay (Liquid Crystal Device), DMD microdisplay (Digital Micromirror Device) or scanning device. By appropriate control, especially computer control, the imaging unit information is modulated onto the light signal emitted by the light source. The modulated light is steered onto a holographic beam combiner which the user, e.g., the driver of a motor vehicle, views.

The term, holographic beam combiner, is understood to mean the hologram, recorded on an appropriate support, of a fitted, preferably white image screen. The hologram is produced in the hologram plane by superposing on a reference beam the object rays scattered by the appropriately illuminated image screen. Later irradiation of the hologram with a projection beam, which is emitted by a projection unit which is in the same spatial relationship to the hologram as the reference beam source was while it was being photographed, produces a virtual image, perceivable by a suitably positioned observer of the holographically photographed image screen or corresponding partial areas thereof. The observer gains the impression of an image screen which is in the same position relative to the beam combiner as the object image screen was positioned relative to the hologram plane. Thus displays can be created which appear to be positioned "in infinity" which places the driver of a motor vehicle in a position to read the displays on a holographic beam combiner arranged in the area of his dashboard without refocusing his eyes, which had been focused "at infinity" to observe the traffic, to the distance of the dashboard that is usually close to him. The cited disclosure discloses corresponding beam combiners for incident light and rear projections, i.e., for use in transmission and reflection. Another advantage of the known system lies in the limitation of the radiation of light from the holographic beam combiner into an angle in space that can be established by the photographing geometry. A holographic display system for aircraft, which can be used in reflection is disclosed in DE 693 05 713 T2.

It is disadvantageous in the known systems that the holographic beam combiner has to be especially made in regard to its size for every application. For adaptation to special installation conditions, complicated optical methods are necessary for scaling the holographic interferogram. An additional disadvantage is to be seen in the fact that the illumination of the holographic beam combiner with free laser beams constitutes a not inconsiderable safety risk, e.g., for the passengers of a motor vehicle interior swept by laser beams.

It is the object of the present invention, therefore, to create a holographic display system which is simpler to manufacture and more flexible and safer in use.

This object is accomplished by the invention by the fact that in and/or on the vehicle at least one observation mirror is provided by which light radiated by the holographic beam combiner can be directed into the optical perception range of a user.

By the configuration according to the invention the holographic beam combiner itself is no longer used as a viewing element as in the state of the art. This function is assigned instead to the viewing mirror. The holographic beam combiner acts instead as the holographic rear projection screen which is viewed only indirectly through the viewing mirror.

Thus it is possible to arrange the holographic beam combiner in spatial proximity to the projection unit, as provided in a preferred embodiment. Accordingly, the paths of the free light beams, preferably laser beams, can be kept extremely short, so that no endangerment of the viewer or to third parties is created. Instead, the light from the holographic beam combiner spread out in a preferred angle passes only through the space between the projection unit and viewing mirror Furthermore, the holographic beam combiner can be manufactured in a standard size which can be optimally adapted to the imaging unit. Adaptation to any particular installation conditions is unnecessary.

In a preferred embodiment, the path of light between the holographic beam combiner and the projection unit is optically shielded ["encapsulated"] externally. Thus safety is enhanced, which is important particularly in the comparatively restricted interior of motor vehicles.

Preferably, the light source comprises a plurality of lasers of different output wavelengths. They can be continual-sweep lasers. To modulate the light signal with the desired image information, an appropriate operation of the imaging unit is all that is needed, which is preferably a programmable computer program. It is also quite possible for the light source to comprise a laser with a controllable output wavelength. In such a system a computer program might control both the imaging unit and the light source, in which case the image build-up would itself be subject substantially to the control of the imaging unit and the coloring of the control of the light source. The light source or sources could be, in addition to lasers, also laser diodes, LED's and EELED'S (edge-emitting LED's).

In an especially advantageous embodiment, the viewing mirror has a curved surface. In particular, the surface can be curved such that the viewing mirror offers an observer properly positioned an enlarged image of the holographic image combiner, i.e., acts as an enlarging mirror. Thus the observer can read large and easily recognizable displays despite the minimal space required for the system.

It is especially advantageous if a plurality of viewing mirrors are provided which make the light from a central projection unit perceivable for observers in different positions. For one thing, this can mean that variously positioned observers can view through their viewing mirrors a common holographic beam combiner. On the other hand, it can also be provided such that several observers who themselves are in different positions will be presented by their viewing mirrors different holographic beam combiners illuminated by a central projection unit. Finally, it can also be arranged that images of different holographic beam combiners will be presented to an observer through several differently positioned viewing mirrors. Other obvious combinations are likewise possible.

To avoid a plurality of holographic beam combiners it can also be advantageous, in the scope of the holographic photography, i.e., the production of the homographic beam combiner, to superimpose holograms taken from different angles. In the completed system, this leads to the emission of the spread light from the holographic beam combiner at several preferred angles in which corresponding viewing mirrors can be arranged. If holograms which were photographed in different directions and/or with different wavelengths are superposed in such a photograph, a display system can be achieved with appropriate control of the imaging unit and appropriate design of the light source, in which different images of it can be presented to central holographic beam combiners through variously positioned viewing mirrors.

Especially preferred is an embodiment in which at least one viewing mirror is arranged in the area of the dashboard of a motor vehicle. Thus the customary arrangement of the display units in the motor vehicle can be retained, while nevertheless avoiding any permanent installation of specific display units such as tachometers, rpm displays etc. Instead, it becomes possible through appropriate programming of the display unit to create specific user and/or situation displays.

In an additional advantageous embodiment it is provided that at least one viewing mirror is arranged in the area of a side window or of the windshield of a motor vehicle. This offers the advantage that the driver can read the displays without entirely removing his eyes from the traffic. Such a viewing mirror is preferably not made reflective in the entire visible spectrum. It is especially advantageous to use for this purpose a mirror which is reflective only in the range of wavelengths produced by the light source and is otherwise transparent. In this way the view outward through the window in question is not impaired or impaired only negligibly.

It can furthermore be provided that at least one viewing mirror is arranged in the area of the back of the driver and/or passenger seat of a motor vehicle. This enables passengers on the back seats to be entertained with videos, TV or computer games during the drive. Of course, for this purpose the control of the imaging unit must be appropriately designed.

The imaging unit can be designed in various ways known to the expert. Appropriate for this purpose are microelectromechanical systems (MEM=microelectromechanical system). Among these are DMD microdisplays (DMD=digital micromirror device), biaxially deflectable micromirrors and GLV (grating light valve). Also suitable are designs such as a LCOS microdisplay (liquid crystal on silicon), a scanning system involving two galvanometer mirrors, a combination of galvanometer irrors and MRS (mechanical resonant scanner) or two MRS.

Such elements as well as the corresponding controls are available commercially in hardware and software and therefore can be integrated at reasonable cost. They can be operated together with laser sources or other light sources. The imaging unit in that case can be controlled by a programmed computer.

Additional details of the invention will be found in the following detailed description and the appended drawings in which preferred embodiments of the invention are represented by way of example.

DETAILED DESCRIPTION OF PREFERRED EMBODIMENT

Figure 1:
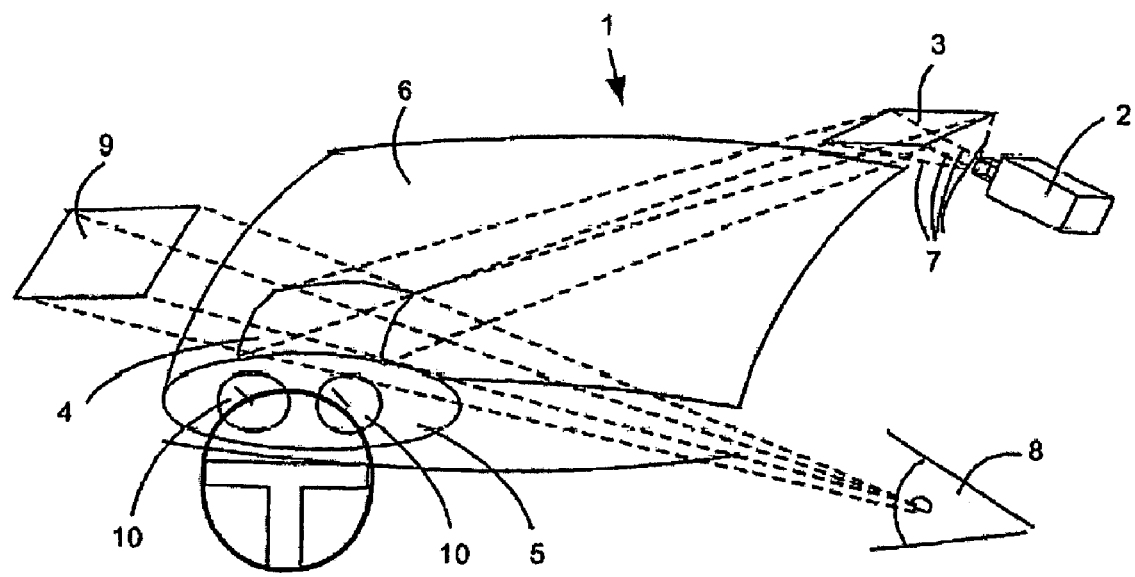
FIG. 1 shows a first embodiment of the display system of the invention.

In FIG. 1 is shown a display system 1 of the invention. The system includes a projection unit 2, a holographic beam combiner, designed as a holographic rear-projection screen 3, and a viewing mirror 4 which is arranged in the dashboard area 5 and the windshield 6 of the motor vehicle. The light rays 7 emitted by the projection unit 2 and modulated with picture information fall upon the holographic beam combiner 3 which is integrated into the car's roof, for example.

The holographic beam combiner 3 spreads the impinging light with an interferometric reconstruction of the original object image screen or at least of its areas defined by the light rays 7, in a preferred spatial angle. This preferred spatial angle overlaps the spatial angle received by the viewing mirror 4, so that an observer 8, if the mirror 4 is in the appropriate angular position, can perceive a bright display as a virtual image 9 of the holographic beam combiner lying behind the mirror 4. As indicated in FIG. 1, the mirror 4 has a curved surface which makes it work like a magnifying mirror, so that the observer, in spite of the small space requirement of the system, is presented with an easily readable display. In the embodiment shown, additional, conventional instruments 10 are arranged within the dashboard 5.

Figure 2:
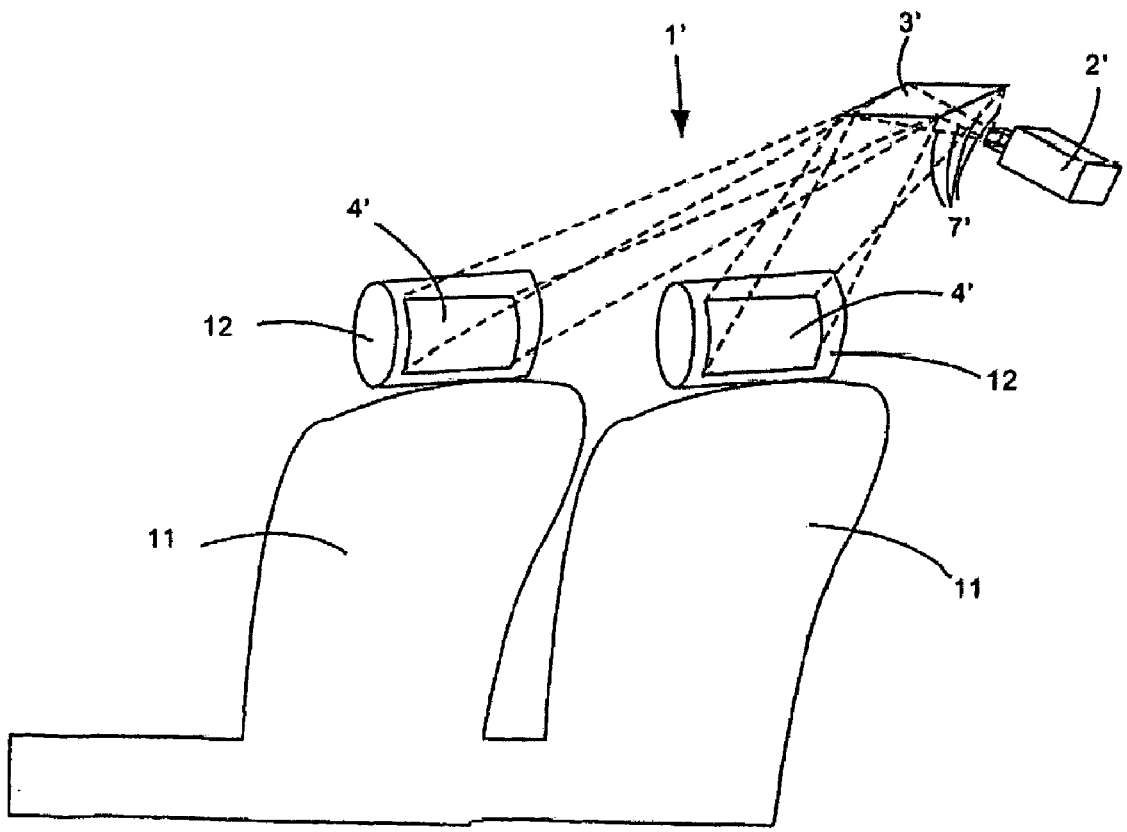
FIG. 2 shows a second embodiment of the display system of the invention.

The embodiment shown in FIG. 2 of a display system 1' according to the invention includes a projection unit 2', a holographic beam combiner designed as a holographic rear projection screen 3', two observation mirrors 4' are provided, which are arranged in the area of the rear sides of the driver and passenger seat 11, especially in the area of the head restraints 12. In the embodiment shown the holographic beam combiner 3' is designed so that the light rays 7' emitted by the projection unit 2' are spread at two preferred spatial angles with modulated image information, with interferometric reconstruction of the original object image screen or at least its areas defined by the light rays 7'. These preferred spatial angles overlap the spatial angles received by the viewing mirrors 4', so that each of two observers, not shown, can perceive, when the angular position of mirror 4' is appropriate, a bright display of virtual images of the holographic beam combiner is seen as lying behind the mirrors 4', although they are not shown in FIG. 2 for the sake of simplicity. Such a holographic beam combiner is obtained, for example, by superimposing two holograms recorded at different angles.

Of course, the present invention is not limited to the illustrated embodiments. Many other advantageous variants are conceivable. For example, particularly the arrangement of the individual system components can differ from the one shown in the drawings. Also it is possible for the rear projection screen 3, 3', to operate by transmission, i.e., illuminated from behind with respect to the display mirrors 4, 4'. This would be make possible, for example, by integrating the projection device 2 in the vehicle's ceiling.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A holographic display system for a vehicle, comprising:
    a projection unit, wherein the projection unit includes a light source for the emission of a luminous signal and a controllable imaging unit illuminated by the light source, with which image information can be modulated on the luminous signal;
    a holographic beam combiner, wherein the modulated luminous signal can be directed against the holographic beam combiner; and
    a viewing mirror provided in or on the vehicle, by which mirror light radiated from the holographic beam combiner can be directed into the optical perception range of a user, wherein the viewing mirror has a curved surface and/or wherein the viewing mirror offers to a properly positioned viewer an enlarged image of the holographic beam combiner, and wherein the imaging unit is in the form of a MEM system or an LCOS microdisplay or a scanning system comprising two galvanometer mirrors or MRS.

2. The holographic display system according to claim 1, wherein the holographic beam combiner is arranged in spatial vicinity to the projection unit.

3. The holographic display system according to claim 2, wherein the light path between the holographic beam combiner and the projection unit is optically encapsulated outwardly.

4. The holographic display system according to claim 1, wherein the holographic beam combiner has superposed holograms recorded in different photographic geometry and/or with different wavelengths.

5. The holographic display system according to claim 4, wherein the viewing mirror is disposed in the area of a dashboard, a side window and/or a windshield of the vehicle.

6. The holographic display system according to claim 5, wherein the viewing mirror is reflective substantially only in the optical spectral range of the light emitted by the light source and is substantially transparent in the rest of the visible spectral range.

7. The holographic display system according to claim 1, wherein the light path between the holographic beam combiner and the projection unit is optically encapsulated outwardly.

8. The holographic display system according to claim 1, wherein the viewing mirror is disposed in the area of a dashboard, a side window and/or a windshield of the vehicle.

9. The holographic display system according to claim 1, wherein the viewing mirror is reflective substantially only in the optical spectral range of the light emitted by the light source and is substantially transparent in the rest of the visible spectral range.

10. A holographic display system for a vehicle, comprising:
    a projection unit, wherein the projection unit includes a light source for the emission of a luminous signal and a controllable imaging unit illuminated by the light source, with which image information can be modulated on the luminous signal;
    a holographic beam combiner, wherein the modulated luminous signal can be directed against the holographic beam combiner; and
    a viewing mirror provided in or on the vehicle, by which mirror light radiated from the holographic beam combiner can be directed into the optical perception range of a user, wherein the holographic beam combiner is arranged in spatial vicinity to the projection unit, wherein the light path between the holographic beam combiner and the projection unit is optically encapsulated outwardly, wherein the viewing mirror has a curved surface and/or wherein the viewing mirror offers to a properly positioned viewer an enlarged image of the holographic beam combiner, wherein the holographic beam combiner has superposed holograms recorded in different photographic geometry and/or with different wavelengths, wherein the viewing mirror is disposed in the area of a dashboard, a side window and/or a windshield of the vehicle, wherein the viewing mirror is reflective substantially only in the optical spectral range of the light emitted by the light source and is substantially transparent in the rest of the visible spectral range, the holographic display system further comprising one or more additional viewing mirrors which make the light of a central projection unit perceptible for more than one observer in different positions.

11. The holographic display system according to claim 10, wherein one of the viewing mirrors is disposed in the area of a dashboard, a side window and/or a windshield of the vehicle, and/or wherein another viewing mirror is disposed in the area of the back of a driver seat or passenger seat.

12. The holographic display system according to claim 11, wherein the imaging unit is in the form of a MEM system or an LCOS microdisplay or a scanning system comprising two galvanometer mirrors or MRS.

13. A holographic display system for a vehicle, comprising:
    a projection unit, wherein the projection unit includes a light source for the emission of a luminous signal and a controllable imaging unit illuminated by the light source, with which image information can be modulated on the luminous signal;
    a holographic beam combiner, wherein the modulated luminous signal can be directed against the holographic beam combiner; and
    a viewing mirror provided in or on the vehicle, by which mirror light radiated from the holographic beam combiner can be directed into the optical perception range of a user, the holographic display system further comprising one or more additional viewing mirrors which make the light of a central projection unit perceptible for more than one observer in different positions.

14. The holographic display system according to claim 13, wherein one of the viewing mirrors is disposed in the area of a dashboard, a side window and/or a windshield of the vehicle, and/or wherein another viewing mirror is disposed in the area of the back of a driver seat or passenger seat.

15. A holographic display system for a vehicle, comprising:
- a projection unit, wherein the projection unit includes a light source for the emission of a luminous signal and a controllable imaging unit illuminated by the light source, with which image information can be modulated on the luminous signal;
- a holographic beam combiner, wherein the modulated luminous signal can be directed against the holographic beam combiner; and
- a viewing mirror provided in or on the vehicle, by which mirror light radiated from the holographic beam combiner can be directed into the optical perception range of a user, wherein the imaging unit is in the form of a MEM system or an LCOS microdisplay or a scanning system comprising two galvanometer mirrors or MRS.

16. A holographic display system for a vehicle, comprising:
- a projection unit, wherein the projection unit includes a light source for the emission of a luminous signal and a controllable imaging unit illuminated by the light source, with which image information can be modulated on the luminous signal;
- a holographic beam combiner, wherein the modulated luminous signal can be directed against the holographic beam combiner; and
- a viewing mirror provided in or on the vehicle, by which mirror light radiated from the holographic beam combiner can be directed into the optical perception range of a user, wherein the viewing mirror has a curved surface and/or wherein the viewing mirror offers to a properly positioned viewer an enlarged image of the holographic beam combiner, wherein the projection unit and the holographic beam combiner are located outside a dashboard of the vehicle, and wherein the imaging unit is in the form of a MEM system or an LCOS microdisplay or a scanning system comprising two galvanometer mirrors or MRS.

* * * * *